United States Patent
Sprague et al.

(10) Patent No.: US 7,479,942 B2
(45) Date of Patent: Jan. 20, 2009

(54) STYLUS WRITING ARCHITECTURES FOR ERASABLE PAPER

(75) Inventors: Robert A. Sprague, Saratoga, CA (US); Tin Pham, San Jose, CA (US)

(73) Assignee: Xerox Corporation, Norwalk, CT (US)

(*) Notice: Subject to any disclaimer, the term of this patent is extended or adjusted under 35 U.S.C. 154(b) by 645 days.

(21) Appl. No.: 10/877,382

(22) Filed: Jun. 25, 2004

(65) Prior Publication Data

US 2004/0263470 A1 Dec. 30, 2004

Related U.S. Application Data

(60) Provisional application No. 60/482,587, filed on Jun. 25, 2003.

(51) Int. Cl.
G09G 3/34 (2006.01)
G06F 3/033 (2006.01)

(52) U.S. Cl. ............... 345/107; 345/85; 345/179
(58) Field of Classification Search ......... 345/107–111, 345/179, 85
See application file for complete search history.

(56) References Cited

U.S. PATENT DOCUMENTS

| | | | | |
|---|---|---|---|---|
| 3,953,206 | A | * | 4/1976 | Weigl ................ 430/57.8 |
| 4,126,854 | A | * | 11/1978 | Sheridon ............... 345/107 |
| 4,326,349 | A | | 4/1982 | Daughtry |
| 5,020,882 | A | | 6/1991 | Makow |
| 5,282,651 | A | | 2/1994 | Alonso |
| 5,351,995 | A | | 10/1994 | Booker |
| 5,604,027 | A | | 2/1997 | Sheridon |
| 5,723,204 | A | | 3/1998 | Stefik |
| 5,892,497 | A | * | 4/1999 | Robertson ............... 345/107 |
| 5,900,858 | A | | 5/1999 | Richley |
| 5,922,268 | A | | 7/1999 | Sheridon |
| 5,930,026 | A | | 7/1999 | Jacobson |
| 6,054,071 | A | | 4/2000 | Mikkelsen, Jr. |
| 6,115,724 | A | | 9/2000 | Booker |
| 6,340,965 | B1 | | 1/2002 | Howard et al. |
| 6,369,793 | B1 | | 4/2002 | Parker |
| 6,456,272 | B1 | * | 9/2002 | Howard et al. ............... 345/107 |
| 6,518,949 | B2 | | 2/2003 | Drzaic |
| 6,535,197 | B1 | | 3/2003 | Comiskey et al. |
| 6,573,880 | B1 | | 6/2003 | Simoni et al. |
| 6,588,131 | B2 | | 7/2003 | O'Connell, Jr. |
| 6,700,695 | B2 | * | 3/2004 | Engler et al. ................ 359/296 |
| 6,704,133 | B2 | | 3/2004 | Gates et al. |

(Continued)

*Primary Examiner*—Amr Awad
*Assistant Examiner*—Randal Willis
(74) *Attorney, Agent, or Firm*—Pillsbury Winthrop Shaw Pittman LLP (57) ABSTRACT

Methods and systems for writing and erasing electric writeable media are disclosed. An electric writeable medium may include a backplane electrode, a display layer including a plurality of elements and a top layer. The medium may further include a plurality of island electrodes. To enable writing to the medium, a stylus is charged to a positive voltage and the backplane electrode is grounded. The stylus is applied to the top layer and/or the island electrodes to deposit charge, which causes proximate elements to display a first color. If the top layer is a resistive layer, grounding the resistive layer and applying a positive voltage to the backplane electrode sufficient to change the displayed color of the elements erases the medium. If the top layer is a photoconductive layer, a light source is further required to enable the photoconductive layer to operate as an electrode when erasing the medium.

15 Claims, 4 Drawing Sheets

U.S. PATENT DOCUMENTS 6,710,540 B1    3/2004  Albert et al.
6,738,050 B2    5/2004  Comiskey et al.
6,864,761 B2 *  3/2005  Eskeldson et al. ........... 333/172
2002/0030638 A1    3/2002  Weiner
2002/0135558 A1    9/2002  Richly

* cited by examiner

STYLUS WRITING ARCHITECTURES FOR ERASABLE PAPER

RELATED APPLICATION AND CLAIM OF PRIORITY

This application claims priority to and incorporates by reference U.S. Provisional Application No. 60/482,587, entitled "Stylus Writing Architectures for Erasable Paper" and filed Jun. 25, 2003.

TECHNICAL FIELD

This invention relates generally to the field of visual displays. More particularly, this invention relates to electric writeable media, such as electric paper, that incorporates either a resistive erasing layer or a photoconductive erasing layer. This invention also relates to erasable electric paper containing a resistive erasing layer or a photoconductive erasing layer.

BACKGROUND

Traditional signs have been based upon printed materials, paper, plastic, metal, etc., and are therefore not programmable. Accordingly, they are not easily changed. In an attempt to overcome this problem, electronically programmable and/or controllable signs were produced and have been in existence for many years. For example, liquid crystal diode (LCD) displays, cathode ray tube (CRT) displays, and other electrically-addressable displays will display an image in response to applied electric signals or fields. However, such signs typically require a large amount of electricity, since they must provide illumination in order to be visible to a viewer.

Various types of electric writeable media, some of which are commonly known as rotatable element displays or electric paper displays, also exist in the prior art. One example of a rotatable element display includes a polymer substrate and bichromal rotatable elements such as balls or cylinders that are in suspension with an enabling fluid and are one color, such as white, on one side and a different color, such as black, on the other. Examples of such rotatable element displays are described in U.S. Pat. No. 5,723,204 to Stefik and U.S. Pat. No. 5,604,027 to Sheridon, each of which is incorporated herein by reference in its entirety. Under the influence of an electric field, the elements rotate so that either the white side or the black side is exposed.

Another type of electric writeable media is known as an electronic ink display, such as the one described in U.S. Pat. No. 6,518,949 to Drzaic, which is incorporated herein by reference. An electronic ink display includes at least one capsule filled with a plurality of particles made of a material, such as titania, and a dyed suspending fluid. When a direct-current electric field of an appropriate polarity is applied across the capsule, the particles move to a viewed surface of the display and scatter light. When the applied electric field is reversed, the particles move to the rear surface of the display and the viewed surface of the display then appears dark.

Yet another type of electric writeable media, also described in U.S. Pat. No. 6,518,949 to Drzaic, includes a first set of particles and a second set of particles in a capsule. The first set of particles and the second set of particles have contrasting optical properties, such as contrasting colors, and can have, for example, differing electrophoretic properties. The capsule also contains a substantially clear fluid. The capsule has electrodes disposed adjacent to it connected to a voltage source, which may provide an alternating-current field or a direct-current field to the capsule. Upon application of an electric field across the electrodes, the first set of particles move toward one electrode, while the second set of particles move toward the second electrode.

Other examples of writeable media include liquid crystal diode displays, encapsulated electrophoretic displays, and other displays.

It has been well proven that electrostatic writing can be done on erasable electric writeable media by swiping an array of electrodes across the surface with a printer-like motion, depositing charge on the surface in an image wise fashion. The charge, once deposited, places a voltage across the medium and causes it to change its electro-optic condition by rotating, twisting or otherwise moving elements. One method of implementing this technology has been to use an islanded structure of isolated conductive material on the top surface of the electric writeable media. Islands of conductive material act as conducting surfaces for charge deposition that do not tribocharge with the writing array of electrodes and distribute the charge across each pixel in a relatively uniform manner.

There has recently been an effort to write on such islanded media with a single point stylus, much like a pen, which deposits charge on the surface causing the elements to of the electric writeable media to change. Stylus writing on electric writeable media has been performed using a uniform erase bar to uniformly charge the surface (at one voltage), followed by writing with a stylus at another voltage. Unfortunately, some applications do not allow for swiping the surface with an erase bar to uniformly charge the media. For example, using a moving erase bar is undesirable in an application implementing a device for capturing signatures digitally with a position sensor based on the pressure applied when using a stylus and visibly with an electric writeable medium.

Therefore, a need exists for creating electric writeable media that permit both stylus writing and electric erase and do not use a moving bar.

The present invention is directed to solving at least this problem.

SUMMARY

Before the present methods and systems are described, it is to be understood that this invention is not limited to the particular methodologies and systems described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a," "an," and "the" include plural references unless the context clearly dictates otherwise. Thus, for example, reference to an "element" is a reference to one or more elements and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described. All publications mentioned herein are incorporated by reference. Nothing herein is to be construed as an admission that the invention is not entitled to antedate such disclosure by virtue of prior invention.

The present invention relates to electric writeable media incorporating either a resistive erasing layer or a photoconductive erasing layer. This invention also relates to a method of writing and erasing an erasable electric writeable medium containing a resistive erasing layer or a photoconductive erasing layer.

In an embodiment, a method for writing and erasing an electric writeable medium including a backplane electrode, a display layer coupled to the backplane electrode, and a resistive layer coupled to the display layer, where the display layer includes a plurality of elements in an enabling medium, includes applying a first voltage differential between a stylus and the backplane electrode, depositing charge on one or more portions of the resistive layer by applying the stylus to the resistive layer, and applying a second voltage differential, inverse to the first voltage differential, between the resistive layer and the backplane electrode. The first voltage differential is sufficient to cause one or more of the elements in the display layer to display a first color. The second voltage differential is sufficient to cause the elements in the display layer to display a second color. The resistive layer has a sufficiently high resistivity to substantially inhibit the deposited charge from spreading laterally through the resistive layer. In an embodiment, the resistive layer has a resistivity between about $10^6$ Ohms/square and about $10^{10}$ Ohms/square. In an embodiment, the resistive layer has a resistivity of about $10^8$ Ohms/square.

In an embodiment, a method for writing and erasing an electric writeable medium including a backplane electrode, a display layer coupled to the backplane electrode, a resistive layer coupled to the display layer, and a plurality of island electrodes coupled to the resistive layer, where the display layer includes a plurality of elements in an enabling medium, includes applying a first voltage differential between a stylus and the backplane electrode, depositing charge on one or more island electrodes using the stylus, and applying a second voltage differential, inverse to the first voltage differential, between the resistive layer and the backplane electrode. The first voltage differential is sufficient to cause one or more of the elements in the display layer to display a first color. The second voltage differential is sufficient to cause the elements in the display layer to display a second color. The resistive layer has a sufficiently high resistivity to substantially inhibit the charge deposited on one island electrode from spreading laterally through the resistive layer to an adjoining island electrode. In an embodiment, the resistive layer has a resistivity between about $10^6$ Ohms/square and about $10^{10}$ Ohms/square. In an embodiment, the resistive layer has a resistivity of about $10^8$ Ohms/square.

In an embodiment, a method for writing and erasing an electric writeable medium including a backplane electrode, a display layer coupled to the backplane electrode, a photoconductive layer coupled to the display layer, and a plurality of island electrodes coupled to the photoconductive layer, where the display layer includes a plurality of elements in an enabling medium, includes applying a first differential voltage between a stylus and the backplane electrode, depositing charge on one or more portions of the electric writeable medium by applying the stylus to at least one of the island electrodes, applying a second voltage differential, inverse to the first voltage differential, between the photoconductive layer and the backplane electrode, and illuminating the photoconductive layer to conduct the second differential voltage across the elements in the display layer. The first voltage differential is sufficient to cause one or more of the elements in the display layer to display a first color. The second voltage differential is sufficient to cause the elements in the display layer to display a second color.

An electric writeable medium includes a layer of a conductive material, a first layer of a film coupled to the layer of conductive material, a display layer, coupled to the first layer of film, for writing or display of content, a second layer of a film coupled to the display layer, and a layer of resistive material coupled to the second layer of film. The display layer includes a plurality of elements in an enabling medium. In an embodiment, the film includes a polyester film. In an embodiment, the polyester film includes MYLAR®, which is Polyethylene Terephthalate. In an embodiment, the electric writeable medium further includes a plurality of island electrodes coupled to the resistive layer.

An electric writeable medium includes a layer of a conductive material, a first layer of a film coupled to the layer of conductive material, a display layer, coupled to the first layer of film, for writing or display of content, a second layer of a film coupled to the display layer, and a layer of photoconductive material coupled to the second layer of film. The display layer includes a plurality of elements in an enabling medium. In an embodiment, the film includes a polyester film. In an embodiment, the polyester film includes MYLAR® (Polyethylene Terephthalate). In an embodiment, the electric writeable medium further includes a plurality of island electrodes coupled to the photoconductive layer.

Various aspects and applications of the present invention will become apparent to the skilled artisan upon consideration of the brief description of the figures and the detailed description of the invention which follows.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
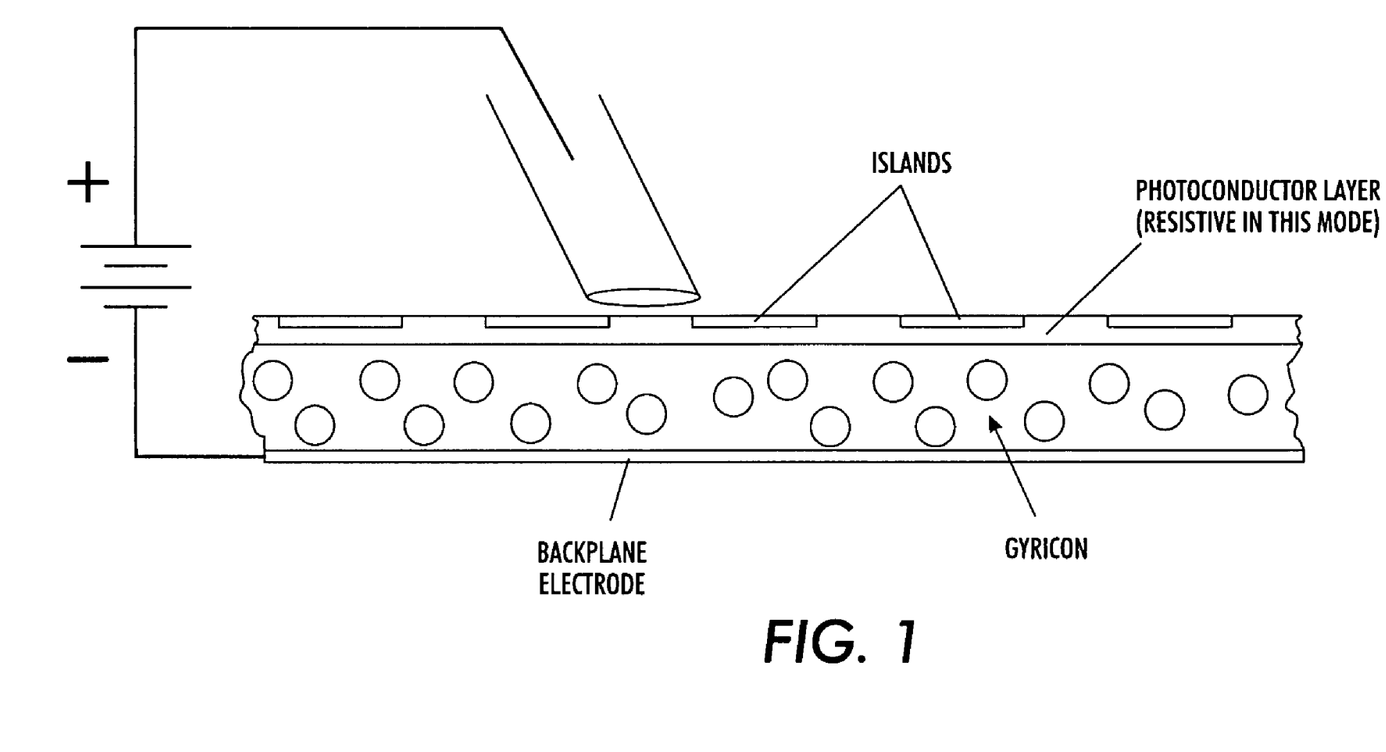
FIG. 1 depicts a cross-sectional view of a printhead printing on an electric writeable medium that uses a resistive film to help support erasure.

FIG. 1 shows the cross section of a printhead printing on an electric writeable medium that uses a resistive film to support erasure of the electric writeable medium. A plurality of conductive islands on the top surface of the electric writeable medium maybe used to capture charge from a stylus, such as a pen. The conductive islands may be coupled to a substantially uniform film with a substantially controlled resistivity. In an alternate embodiment, the electric writeable medium includes no conductive islands.

When a user wishes to write on the electric writeable medium, the backplane electrode on the bottom surface of the electric writeable medium may be driven to ground and a stylus may be driven to a positive voltage suitable for writing. The stylus may be brought in contact with one or more of the plurality of conductive islands to deposit charge on the contacted islands. This charge may generate a voltage across the electric writeable medium sufficient to cause, in a layer for writing or display of content, one or more of a plurality of elements, each in an enabling medium, to change a displayed color.

In an alternate embodiment, the electric writeable medium includes no conductive islands. In such an embodiment, the stylus is brought in contact with the resistive layer. The stylus may be used to create a voltage differential across the electric writeable medium sufficient to cause one or more elements proximate to the location in the display layer where the stylus is in contact with the resistive layer to change a displayed color while the stylus is in contact with the resistive layer. When the stylus is removed from the resistive layer, the elements in the display layer may maintain the same displayed color. In an embodiment, the displayed color of the changed elements in the display layer after the application of the electric field is non-white.

The resistive layer may possess a finite conductivity permitting the charge deposited on a conductive island to slowly leak off to neighboring islands through a current path including the resistive layer and capacitive coupling to the backplane. The resistivity of the resistive layer may be chosen such that this leakage takes significantly longer than the time required to modify the color of an element. In an embodiment, the resistivity of the resistive layer is selected such that the leakage takes longer than the expected lifetime of the written material on the electric writeable medium. In an embodiment, the resistivity of the resistive layer is chosen such that the charge only spreads from a conductive island to its nearest neighboring conductive islands.

Figure 2:
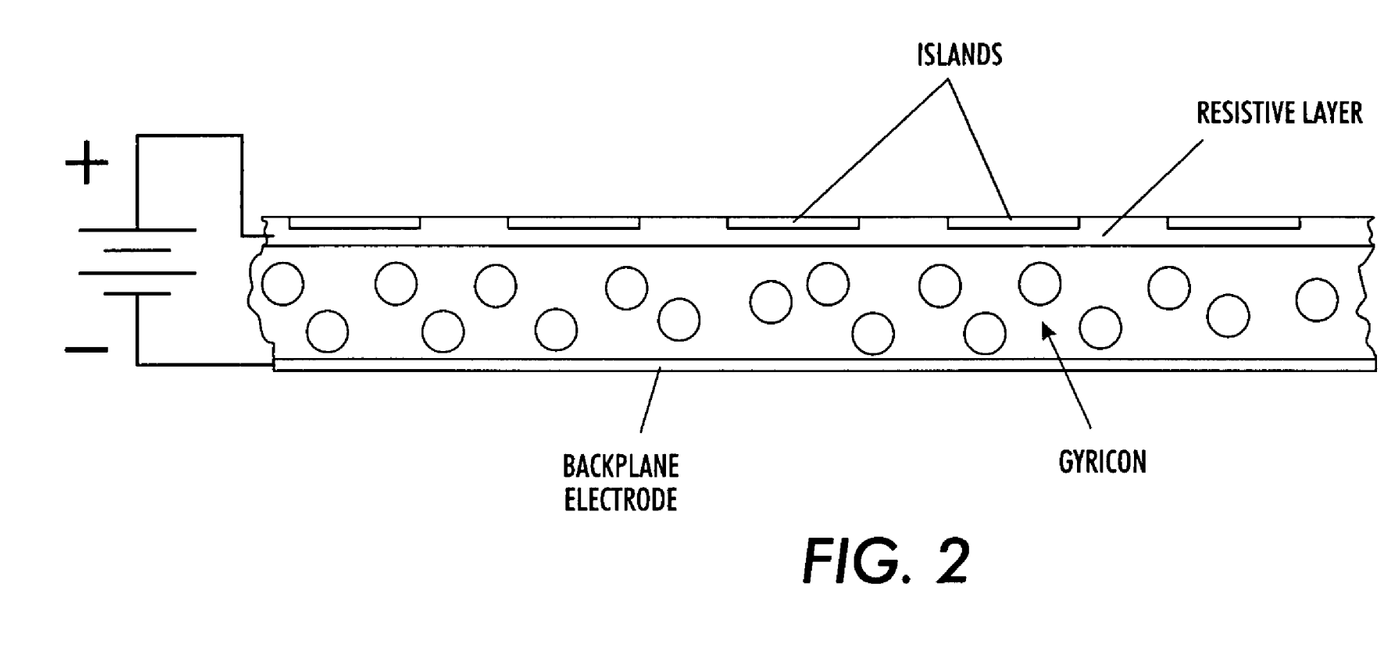
FIG. 2 depicts an erasing procedure for erasing an electric writeable medium that includes a resistive erasing layer.

FIG. 2 depicts an erasing procedure for erasing an electric writeable medium that includes a resistive erasing layer. When a user wishes to erase the electric writeable medium, the resistive layer may be driven to ground and the backplane electrode may be driven to a positive voltage in order to generate a uniform inverse electric field between the resistive layer and the backplane electrode sufficient to cause substantially all of the elements in the display layer to display a uniform displayed color. In an embodiment, the uniform displayed color is white. A user may perceive the application of this uniform electric field as erasing the material written on the electric writeable medium. The voltage differential that generates the uniform inverse electric field between the resistive layer and the backplane electrode may be applied for a time sufficient to modify the displayed color of substantially all of the plurality of elements in the display layer even in the presence of the resistive layer. In a preferred embodiment, the resistive layer may contact the voltage source in a plurality of edge locations to minimize the effective resistance of the resistive layer during the erasing process. Further, the resistivity of the resistive layer may be selected to be the lowest value that sufficiently prevents charge leakage during the writing process. In an embodiment, the voltage between the resistive layer and the backplane electrode may be reversed a plurality of times during the erasing process.

The resistivity of the resistive layer may be selectively chosen. An improperly selected resistivity may require an excessive time to implement the erasing procedure or may allow an unacceptable amount of charge leakage during the writing process. The equation describing the desired conductivity of the resistive layer is the following:

$R = V/(C*dV/dt)$, where

R = the layer bleed surface resistivity seen by each pixel (resistivity per square divided by 8 (which represents the eight pixels surrounding each pixel));
C = pixel capacitance;
V = voltage written with stylus; and
dV/dt = acceptable rate of voltage leakage from a conductive island.

The resistive layer may have a resistivity between about $10^6$ Ohms/square and about $10^{10}$ Ohms/square. The resistive layer may have a resistivity of about $10^8$ Ohms/square.

Although the description and pictures relate to utilizing one type of electric writeable media, it will be apparent to one skilled in the art that the same application maybe applied to other types of electric writeable media such as voltage driven materials.

Figure 3:
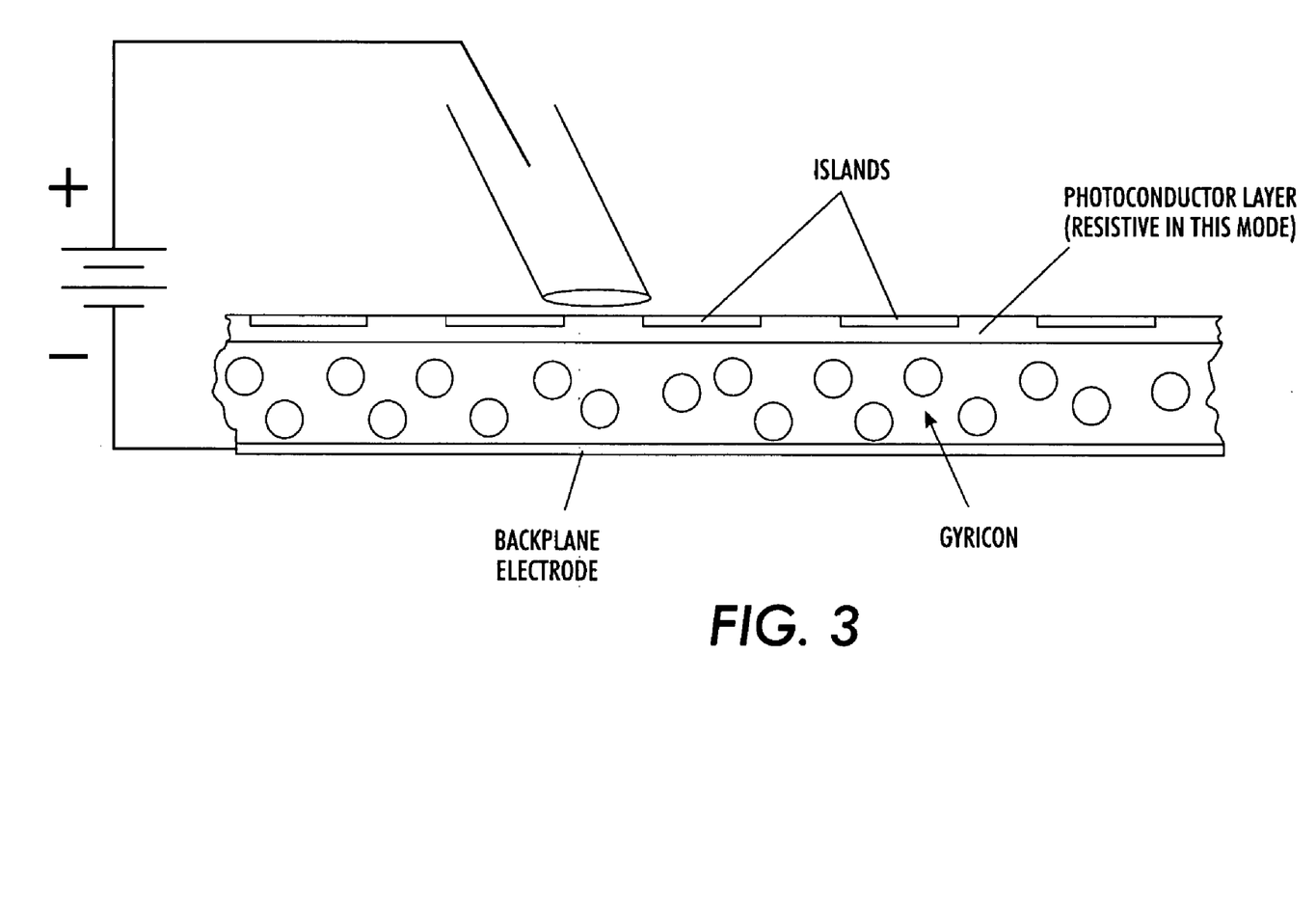
FIG. 3 depicts a cross-sectional view of a printhead printing on an electric writeable medium that uses a photoconductive film to help support erasure.

FIG. 3 depicts the cross section of a printhead printing on an electric writeable medium that uses a photoconductive film to support erasure of the electric writeable medium. A plurality of conductive islands on the top surface of the electric writeable medium may be used to capture charge from a stylus, such as a pen. The islanded structure may be built on top of a substantially uniform film with a substantially controlled resistivity.

When a user wishes to write on the electric writeable medium, the backplane electrode on the bottom surface of the electric writeable medium may be driven to ground and a stylus may be driven to a positive voltage suitable for writing. The photoconductive layer may be in the presence of insufficient ambient illumination during the writing process to significantly impact its photoconductivity. Thus, the photoconductive layer may act as an insulator during the writing process.

The stylus may be brought in contact with one or more of the conductive islands to deposit charge on the contacted islands. This charge may generate a voltage across the electric writeable medium sufficient to cause one or more elements in an enabling medium, in a layer for writing or display of content, to change a displayed color. In an embodiment, the displayed color of the changed elements in the display layer after the application of the electric field is non-white.

Figure 4:
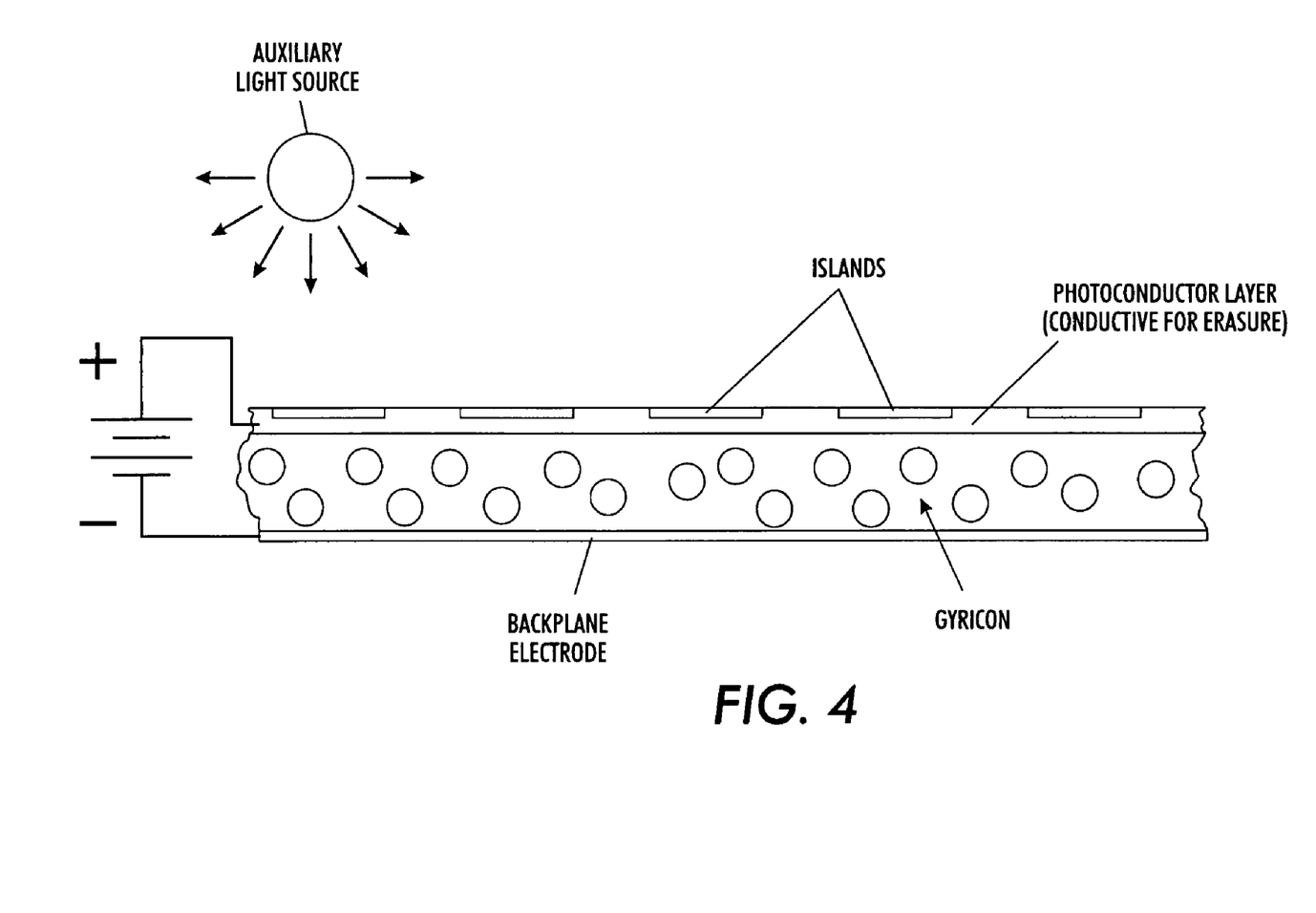
FIG. 4 depicts an erasing procedure for erasing an electric writeable medium that includes a photoconductive erasing layer.

FIG. 4 depicts an erasing procedure for erasing an electric writeable medium that includes a photoconductive erasing layer. When a user wishes to erase the electric writeable medium, the photoconductive layer may be driven to ground and the backplane electrode may be driven to a positive voltage in order to generate a uniform inverse electric field between the photoconductive layer and the backplane electrode sufficient to cause substantially all of the elements in the display layer to display a uniform displayed color. In an embodiment, the uniform displayed color is white. A user may perceive the application of this uniform electric field as erasing the material written on the electric writeable medium. An auxiliary light source may be used to illuminate the photoconductive layer during the erasing process. Illuminating the photoconductive layer may turn the layer into a conductive layer, enabling the photoconductive layer to act as an electrode. In an embodiment, the voltage between the photoconductive layer and the backplane electrode may be reversed a plurality of times during the erasing process. Prior to rewriting the electric writeable medium, the auxiliary light source may be turned off and the voltage differential for engaging in the writing process may be applied.

In an alternate embodiment, an electric writeable medium may include a layer of conductive material, a first layer of film, such as MYLAR® (Polyethylene Terephthalate), coupled to the layer of conductive material, a layer for writing or display of content coupled to the first layer of film and including a plurality of twisting elements in an enabling medium, a second layer of film, such as MYLAR® (Polyethylene Terephthalate), coupled to the display layer, and a layer of resistive material operative coupled to the second layer of film.

In an alternate embodiment, an electric writeable medium may include a layer of a conductive material, a first layer of film, such as MYLAR® (Polyethylene Terephthalate), coupled to the layer of conductive material, a layer for writing or display of content coupled to the first layer of film and including a plurality of twisting elements in an enabling medium, a second layer of film, such as MYLAR® (Polyethylene Terephthalate), coupled to the display layer, and a layer of photoconductive material operative coupled to the second layer of film.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A method for writing and erasing an electric writeable medium comprising a backplane electrode, a display layer coupled to the backplane electrode, and a resistive layer coupled to the display layer, wherein the display layer includes a plurality of elements in an enabling medium, the method comprising:

applying a first voltage differential between a stylus and the backplane electrode, wherein the first voltage differential is sufficient to cause one or more of the elements in the display layer to display a first color;

depositing charge on one or more portions of the resistive layer by applying the stylus to the resistive layer, the resistive layer comprising an array of electrodes positioned within recesses formed in an upper portion of the resistive layer, wherein a top surface of the resistive layer laterally abuts a top surface of the array of electrodes such that the top surfaces of the resistive layer and the array of electrodes each separately form portions of a top surface of a contiguous planar surface and a lower portion of the resistive layer extends continuously underneath the entire array of electrodes, wherein the resistive layer has a sufficiently high resistivity to substantially inhibit the deposited charge from spreading laterally through the resistive layer; and applying a second voltage differential, inverse to the first voltage differential, between the resistive layer and the backplane electrode, wherein the second voltage differential is sufficient to erase the elements in the display layer to display a second color.

2. The method of claim 1 wherein the resistive layer has a resistivity between about $10^6$ Ohms/square and about $10^{10}$ Ohms/square.

3. The method of claim 1 wherein the resistive layer has a resistivity of about $10^8$ Ohms/square.

4. A method for writing and erasing an electric writeable medium comprising a backplane electrode, a display layer coupled to the backplane electrode, a resistive layer coupled to the display layer, and a plurality of island electrodes coupled to the resistive layer, wherein the display layer includes a plurality of elements in an enabling medium, the method comprising:

applying a first voltage differential between a stylus and the backplane electrode, wherein the first voltage differential is sufficient to cause one or more of the elements in the display layer to display a first color;

depositing charge on one or more island electrodes using the stylus, the island electrodes being positioned within recesses formed in an upper portion of the resistive layer, wherein a top surface of the resistive layer laterally abuts a top surface of the island electrodes such that the top surfaces of the resistive layer and the island electrodes each separately form portions of a top surface of a contiguous planar surface and a lower portion of the resistive layer extends continuously underneath the entire island electrodes, wherein the resistive layer has a sufficiently high resistivity substantially inhibit the charge deposited on one island electrode from spreading laterally through the resistive layer to an adjoining island electrode; and applying a second voltage differential, inverse to the first voltage differential, between the resistive layer and the backplane electrode, wherein the second voltage differential is sufficient to cause the elements in the display layer to display a second color.

5. The method of claim 4 wherein the resistive layer has a resistivity between about $10^6$ Ohms/square and about $10^{10}$ Ohms/square.

6. The method of claim 4 wherein the resistive layer has a resistivity of about $10^8$ Ohms/square.

7. A method for writing and erasing an electric writeable medium comprising a backplane electrode, a display layer coupled to the backplane electrode, a photoconductive layer coupled to the display layer, and a plurality of island electrodes coupled to the photoconductive layer, wherein the display layer includes a plurality of elements in an enabling medium, the method comprising:

applying a first differential voltage between a stylus and the backplane electrode, wherein the first voltage differential is sufficient to cause one or more of the elements in the display layer to display a first color;

depositing charge on one or more portions of the electric writeable medium by applying the stylus to at least one of the island electrodes, the island electrodes being positioned within recesses formed in an upper portion of the photoconductive layer, wherein a top surface of the photoconductive layer laterally abuts a top surface of the island electrodes such that the top surfaces of the photoconductive layer and the island electrodes each separately form portions of a top surface of a contiguous planar surface and a lower portion of the photoconductive layer extends continuously underneath the entire array of electrodes;

applying a second voltage differential, inverse to the first voltage differential, between the photoconductive layer and the backplane electrode, wherein the second voltage differential is sufficient to cause the elements in the display layer to display a second color; and illuminating the photoconductive layer to conduct the second differential voltage across the elements in the display layer.

8. An electric writeable medium comprising:

a layer of a conductive material;

a first layer of a film coupled to the layer of conductive material;

a display layer, coupled to the first layer of film, for writing or display of content, wherein the display layer includes a plurality of elements in an enabling medium;

a second layer of a film coupled to the display layer;

a layer of resistive material coupled to the second layer of film; and a plurality of electrodes positioned within recesses formed in an upper portion of the resistive layer such that a top surface of the resistive layer laterally abuts a top surface of the electrodes such that the top surfaces of the resistive layer and the electrodes each separately form portions of a top surface of a contiguous planar surface and a lower portion of the resistive layer extends continuously underneath the entire array of electrodes.

9. The electric writeable medium of claim 8 wherein the film comprises a polyester film.

10. The electric writeable medium of claim 9 wherein the polyester film is formed of polyethylene terephthalate.

11. The electric writeable medium of claim 8, wherein the plurality of electrodes are laterally insulated by from each other by the resistive layer.

12. An electric writeable medium comprising:
a layer of a conductive material;
a first layer of a film coupled to the layer of conductive material;
a display layer, coupled to the first layer of film, for writing or display of content, wherein the display layer includes a plurality of elements in an enabling medium;
a second layer of a film coupled to the display layer; and
a layer of photoconductive material coupled to the second layer of film; and
a plurality of electrodes positioned within recesses formed in an upper portion of the photoconductive layer such that a top surface of the photoconductive layer laterally abuts a top surface of the electrodes such that the top surfaces of the photoconductive layer and the electrodes each separately form portions of a top surface of a contiguous planar surface and a lower portion of the photoconductive layer extends continuously underneath the entire array of electrodes.

13. The electric writeable medium of claim 12 wherein the film comprises a polyester film.

14. The electric-writeable medium of claim 13 wherein the polyester film is formed of polyethylene terephthalate.

15. The electric writeable medium of claim 12, wherein the plurality of electrodes are laterally insulated by from each other by the photoconductive layer.

* * * * *